United States Patent
Crews (10) Patent No.: US 7,595,284 B2
(45) Date of Patent: Sep. 29, 2009

(54) METAL-MEDIATED VISCOSITY REDUCTION OF FLUIDS GELLED WITH VISCOELASTIC SURFACTANTS

(76) Inventor: James B. Crews, Baker Oil Tools, 2001 Rankin Rd., Houston, TX (US) 77073-5114

( * ) Notice: Subject to any disclaimer, the term of this patent is extended or adjusted under 35 U.S.C. 154(b) by 583 days.

(21) Appl. No.: 11/145,630

(22) Filed: Jun. 6, 2005

(65) Prior Publication Data
US 2006/0041028 A1    Feb. 23, 2006

Related U.S. Application Data

(60) Provisional application No. 60/577,682, filed on Aug. 20, 2004.

(51) Int. Cl.
*C09K 8/584* (2006.01)
*B01D 43/00* (2006.01)

(52) U.S. Cl. .................. 507/239; 507/271; 507/921; 516/102; 516/104; 516/113

(58) Field of Classification Search .............. 507/239, 507/271, 921; 516/102, 104, 113
See application file for complete search history.

(56) References Cited

U.S. PATENT DOCUMENTS

| | | | |
|---|---|---|---|
| 4,220,566 A | 9/1980 | Constien et al. | |
| 4,397,776 A | 8/1983 | Ward | |
| 4,609,475 A | 9/1986 | Hanlon et al. | |
| 4,687,592 A * | 8/1987 | Collins et al. | 510/376 |
| 4,735,731 A | 4/1988 | Rose et al. | |
| 5,054,552 A | 10/1991 | Hall et al. | |
| 5,143,157 A | 9/1992 | Harms | |
| 5,362,412 A | 11/1994 | Hartman et al. | |
| 5,624,886 A | 4/1997 | Dawson et al. | |
| 5,950,731 A | 9/1999 | Shuchart et al. | |
| 5,964,295 A | 10/1999 | Brown et al. | |
| 6,232,274 B1 | 5/2001 | Hughes et al. | |
| 6,394,185 B1 | 5/2002 | Constien | |
| 6,506,710 B1 | 1/2003 | Hoey et al. | |
| 6,599,863 B1 | 7/2003 | Palmer et al. | |
| 6,844,297 B2 | 1/2005 | Allan et al. | |
| 2002/0033260 A1 | 3/2002 | Lungwitz et al. | |
| 2002/0076803 A1 | 6/2002 | Crews | |
| 2003/0082101 A1 | 5/2003 | Taylor et al. | |
| 2003/0139298 A1 | 7/2003 | Fu et al. | |
| 2003/0236174 A1 | 12/2003 | Fu et al. | |
| 2004/0019199 A1 | 1/2004 | Crews | |

FOREIGN PATENT DOCUMENTS

WO    WO 01/77487 A2    10/2001
WO    WO 01/77487 A3    10/2001

OTHER PUBLICATIONS

A. L. Lehninger, Biochemistry, Second Edition, 1975, Worth Publishers, New York, NY, Title and Copyright Pages only.
D. A. McQuarrie, et al., General Chemistry, Second Edition, 1987, W. H. Freeman and Company, New York, NY, Title and Copyright Pages only.
T. W. G. Solomons, Organic Chemistry, Fourth Edition, 1988, John Wiley & Sons, New York, NY, Title and Copyright Pages only.
E. McCrady, "Effects of Metals on Paper: A Literture Review," Alkaline Paper Advocate, May 1996, vol. 9, No. 1. Available from http://palimpsest.stanford.edu/byorg/abbey/ap/ap09/ap09-1/ap09-109.html, Apr. 11, 2005.
G. R. Buettner, et al., "Catalytic Metals, Ascorbate and Free Radicals: Combinations to Avoid," Radiation Research, 1996, pp. 532-541, No. 145.
S. E. Stait, et al., "The Effects of Ascorbate and Dehydroascorbate on the Oxidation of Low-Density Lipoprotein," Biochem. J., 1996, pp. 373-381, No. 320.
N. K. Urbanski, et al., "Generation of .OH Initiated by Interaction of Fe2+ and Cu+ with Dioxygen; Comparison with the Fenton Chemistry," Acta Biochimica Polonica, 2000, pp. 951-962, vol. 47, No. 4.
J. R. Requena, et al., "Glutamic and Aminoadipic Semialdehydes are the Main Carbonyl Products of Metal-Catalyzed Oxidation Of Proteins," Proceedings of the National Academy of Sciences of the United States, Jan. 2, 2001, pp. 69-74, vol. 98, No. 1.
L. Wang, et al., "Synthesis and Characterization of MCM-41 Mesoporous Molecular Sieves Containing Copper and Zinc," Symposium on the Synthesis and Characterization of Microporous and Mesoporous Materials, Division of Petroleum Chemistry, American Chemical Society, Apr. 1-5, 2001, pp. 20-22, vol. 46, No. 1.

(Continued)

*Primary Examiner*—Timothy J Kugel
(74) *Attorney, Agent, or Firm*—Mossman, Kumar & Tyler, PC (57) ABSTRACT

Fluids viscosified with viscoelastic surfactants (VESs) may have their viscosities reduced (gels broken) by the direct or indirect action of a composition that contains at least one metal ion source and optionally at least one second source. An optional second source may be a chelating agent where at least one reducing agent source may be additionally optionally used. Another optional component with the metal ion source includes a second, different metal ion source. The breaking composition is believed to directly attack the VES itself, possibly by disaggregating or otherwise attacking the micellar structure of the VES-gelled fluid, and/or possibly by changing the chemical structure of the VES to give two or more products.

34 Claims, 8 Drawing Sheets

OTHER PUBLICATIONS

W. Hettinger, "Manganese Promoted Cracking Catalysts," Petroleum Chemistry Division Preprints, American Chemical Society, Jul. 2002, pp. 120-124, vol. 47, No. 2.

E. Santacesaria, et al., "Acid-Base and Redox Catalysts Preparation by Grafting Alkoxides on the Surface of Oxides," Petroleum Chemistry Division Preprints, American Chemical Society, Jul. 2002, pp. 262-265, vol. 47, No. 3.

Abstract of B. Wen, et al. "Synergism of Cobalt and Palladium in Zeolite MFI for the Catalytic NO Reduction with Methane," Preprints—Division of Petroleum Chemistry, American Chemical Society, Jul. 2002, pp. 158-160, vol. 47, No. 2.

Abstract of P. Moggi, et al., "Oxidative Dehydrogenation of Propane on Pure and Silica-Dispersed Multimetallic Oxides Based on Vandium and Nobium Prepared Via Hydrolytic and Non-Hydrolytic Sol-Gel Methods," Preprints—Division of Petroleum Chemistry, American Chemical Society, Jul. 2002, pp. 151-154, vol. 47, No. 2.

A. Datta, et al., "Novel Vanadium Phosphate Phases as Catalysts for Selective Oxidation," Proceedings Indian Academy of Sciences, Aug. 2002, pp. 379-390, vol. 114, No. 4.

M. L. Occelli, et al., "Dual Function Fluid Cracking Catalyst (DFC-C)Containing a Microporous Additive for Olefin Selectivity," Preprints—Division of Petroleum Chemistry, American Chemical Society, Jul. 2003, pp. 231-234, vol. 48, No. 3.

M. R. Leach, "The Chemogenesis Web Book," pp. 1-9. Available at http://www.meta-synthesis.com/webbook/15_redox/redox.html, Jun. 16, 2004.

P. L. Nostro, "Vitamin C Derivatives as Antioxidant Agents," Biological Chemistry, Internet Journal of Science, 1997, pp. 1-7, vol. 4. Available from http://www.netsci-journal.com/97v4/97014/vitc5.html, Jan. 19, 2005.

"Initiation of Radical Chain Reactions," Topics in Food Chemistry, FIDEL (Food Internet-based Distance Learning), Dept. of Chemical Eng., Instituto Superior T'ecnico, Lisbon, Portugal, pp. 1-7. Available from http://alfa.ist.utl.pt/~fidel/creac/sec41b1c.html, Mar. 30, 2005.

P. L. Nostro, "Conclusions," Biological Chemistry, Internet Journal of Science, 1997, pp. 1-2, vol. 4. Available from http://www.netsci-journal.com/97v4/97014/vitc7.html, Apr. 11, 2005.

PCT International Search Report for International Application No. PCT/US2005/019909, Nov. 3, 2005.

* cited by examiner

METAL-MEDIATED VISCOSITY REDUCTION OF FLUIDS GELLED WITH VISCOELASTIC SURFACTANTS

CROSS-REFERENCE TO RELATED APPLICATION

This application claims the benefit of U.S. Provisional Application No. 60/577,682 filed Aug. 20, 2004.

FIELD OF THE INVENTION

The present invention relates to gelled treatment fluids used during hydrocarbon recovery operations, and more particularly relates, in one embodiment, to methods of "breaking" or reducing the viscosity of aqueous treatment fluids containing viscoelastic surfactant gelling agents used during hydrocarbon recovery operations.

BACKGROUND OF THE INVENTION

Hydraulic fracturing is a method of using pump rate and hydraulic pressure to fracture or crack a subterranean formation in a process for improving the recovery of hydrocarbons from the formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates that can cause the fluids to degrade and prematurely settle out the proppant before the fracturing operation is complete. Various fluids have been developed, but most commercially used fracturing fluids are aqueous based liquids that have either been gelled or foamed. When the fluids are gelled, typically a polymeric gelling agent, such as a solvatable polysaccharide, for example guar and derivatized guar polysaccharides, is used. The thickened or gelled fluid helps keep the proppants within the fluid. Gelling can be accomplished or improved by the use of crosslinking agents or crosslinkers that promote crosslinking of the polymers together, thereby increasing the viscosity of the fluid. One of the more common crosslinked polymeric fluids is borate crosslinked guar.

The recovery of fracturing fluids may be accomplished by reducing the viscosity of the fluid to a low value so that it may flow naturally from the formation under the influence of formation fluids. Crosslinked gels generally require viscosity breakers to be injected to reduce the viscosity or "break" the gel. Enzymes, oxidizers, and acids are known polymer viscosity breakers. Enzymes are effective within a pH range, typically a 2.0 to 10.0 range, with increasing activity as the pH is lowered towards neutral from a pH of 10.0. Most conventional borate crosslinked fracturing fluids and breakers are designed from a fixed high crosslinked fluid pH value at ambient temperature and/or reservoir temperature. Optimizing the pH for a borate crosslinked gel is important to achieve proper crosslink stability and controlled enzyme breaker activity.

While polymers have been used in the past as gelling agents in fracturing fluids to carry or suspend solid particles as noted, such polymers require separate breaker compositions to be injected to reduce the viscosity. Further, such polymers tend to leave a coating on the proppant and a filter cake of dehydrated polymer on the fracture face even after the gelled fluid is broken. The coating and/or the filter cake may interfere with the functioning of the proppant. Studies have also shown that "fish-eyes" and/or "microgels" present in some polymer gelled carrier fluids will plug pore throats, leading to impaired leakoff and causing formation damage.

Recently it has been discovered that aqueous drilling and treating fluids may be gelled or have their viscosity increased by the use of non-polymeric viscoelastic surfactants (VES). These VES materials are advantageous over the use of polymer gelling agents in that they do not leave a filter cake on the formation face, do not coat the proppant or create microgels or "fish-eyes", and have reduced potential for damaging the formation relative to polymers. However, little progress has been made toward developing internal breaker systems for the non-polymeric VES-based gelled fluids, that is, breaker systems that use products that are incorporated and solubilized within the VES-gelled fluid that are activated by downhole conditions that will allow a controlled rate of gel viscosity reduction over a rather short period of time of 1 to 4 hours or so similar to gel break times common for conventional crosslinked polymeric fluid systems. A challenge has been that VES-gelled fluids are not comprised of polysaccharide polymers that are easily degraded by use of enzymes or oxidizers, but are comprised of surfactants that associate and form viscous rod- or worm-shaped micelle structures. Conventional enzymes and oxidizers have not been found to act and degrade the surfactant molecules or the viscous micelle structures they form. It is still necessary, however, to provide some mechanism that uses internally solubilized breaker products that will break the viscosity of VES-gelled fluids.

It would be desirable if a viscosity breaking system could be devised to break the viscosity of fracturing and other well completion fluids gelled with and composed of viscoelastic surfactants, and in particular break the viscosity relatively quickly.

SUMMARY OF THE INVENTION

Accordingly, it is an object of the present invention to provide a method for breaking the viscosity of aqueous treatment fluids gelled with viscoelastic surfactants (VESs).

It is another object of the present invention to provide compositions and methods for breaking VES-surfactant substrates fluids relatively quickly.

Still another object of the invention is to provide methods and VES fluid compositions for breaking the viscosity of aqueous fluids gelled with viscoelastic surfactants using readily available materials at relatively inexpensive concentrations.

In carrying out these and other objects of the invention, there is provided, in one form, a method for breaking viscosity of aqueous fluids gelled with a viscoelastic surfactant (VES) that involves adding to an aqueous fluid gelled with at least one viscoelastic surfactant a composition in an amount effective to reduce the viscosity of the gelled aqueous fluid. The composition includes at least one metal ion source. Optional components of the composition may include, but are not necessarily limited to, a reducing agent source, and/or a chelating agent, or may be a second metal ion source.

There is provided in another non-limiting embodiment herein a method for breaking viscosity of aqueous fluids gelled with a VES involving adding to an aqueous fluid gelled with at least one viscoelastic surfactant a composition in an amount effective to reduce the viscosity of the gelled aqueous fluid, The composition includes at least one metal ion source, at least one chelating agent and at least one reducing agent source. The composition may reduce the viscosity of the gelled aqueous fluid by a mechanism including, but not necessarily limited to, disaggregating a micelle structure of the VES, rearranging a micelle structure of the VES, chemically altering an effective amount of the VES, and combinations thereof.

In another, alternate embodiment, there is provided an aqueous fluid that includes water; at least one viscoelastic surfactant (VES) in an amount effective to increase the viscosity of the aqueous fluid and a composition in an amount effective to reduce the viscosity of the gelled aqueous fluid. Again, the composition includes at least one metal ion. The optional components may be those described in the previous two paragraphs above.

DETAILED DESCRIPTION OF THE INVENTION

As noted, aqueous fluids gelled with viscoelastic surfactants are typically used in wellbore completions, such as hydraulic fracturing, without the use of an internal breaker system, and typically rely on external downhole conditions for the VES-gelled fluid to break, such as dilution with reservoir brine or gel breaking through interaction with reservoir hydrocarbons during production of such reservoir fluids to the surface. There are aqueous fluids gelled with viscoelastic surfactants that are known to be "broken" or have their viscosities reduced, although some of the known breaking methods utilize external clean-up fluids (such as pre- and post-flush fluids placed within the reservoir before and after well completion treatments, such as conventional gravel packing and also "frac-packing"—hydraulic fracturing followed by gravel packing treatment). There are other known methods, but they are relatively slow—for instance the use of VES-gel breaking bacteria with fluid viscosity break times ranging from half a day up to 7 days. There has evolved in the stimulation fluid art an industry standard need for "quick gel break", but for VES-gelled fluids this has been a substantially challenging problem. There needs to be a method for breaking VES-gelled fluids that is as easy, as quick, and as economic as breaking conventional crosslinked polymer fluids.

A new method has been discovered to reduce the viscosity of aqueous fluids gelled with viscoelastic surfactants (i.e. surfactants that develop viscosity in aqueous brines by formation of rod- or worm-shaped micelle structures). The improvement will allow relatively very quick breaks, such as within 1 to 12 hours, compared to the current technology of using bacteria to break VES which takes at least 12 or more hours, and more typically 4 to 7 days. The breaker components of this invention can be added to the gel and put into solution during a VES-gel treatment or the components can be used separately, if needed, as an external breaker solution to remove VES gelled fluids already placed downhole.

The method employs at least one metal ion source as a breaker component. Without wanting to limit the invention to any supposed theory or mechanism, the alteration that occurs in breaking the VES gel is believed to be transition metal-mediated and/or transition metal-catalyzed. The terms "metal-mediated" and "metal-catalyzed" are used herein as equivalent terms, and mean that a transition metal is needed for the reaction or sequence of reactions to occur, whether or not the exact mechanism is catalytic.

The terms "altered" and "alteration" are used herein to mean any change to the VES compound where it can no longer form, maintain or sustain viscous micelle structures. Thus, "altered" or "alteration" may include, but are not necessarily limited to: (i) a rearrangement of bonds on the VES, (ii) an addition to the VES (such as hydrogen, water molecule, etc.) or (iii) an elimination (decomposition or degradation) of the VES, e.g. where the VES after alteration now equals two or more other compounds.

The primary reaction that chemically alters the VES structure is believed to be a redox reaction, without necessarily being limited by this explanation. That is, it is expected that both reduction and oxidation occur in the reaction. A "redox" reaction is defined herein to be any reaction in which electrons are removed from one molecule or atom and given to another molecule or atom. In the processes described herein, such redox reactions are transition metal-mediated.

In most cases in the methods described herein, the alteration that occurs is not complete; meaning not all of the VES (e.g. VES compounds such as Akzo Nobel Aromox APA-T) is altered; only a portion of the molecules has been altered. In practical terms, the metal-mediated alteration results in a ratio of altered to unaltered VES molecules. That is, typically a "broken VES fluid" is composed of a ratio of altered to unaltered VES molecules.

The ratio or amount of altered to unaltered VES molecules that cause VES gel break appears to be based on one or more of the following factors and possibly others:

a. less altered VES is required to break the gel as fluid temperature increases;
b. more altered VES is required to break the gel as VES (such as Aromox APA-T VES) loading increases;
c. more altered VES is required to break the gel when VES counterions or stabilizing agents are used, including, but not necessarily limited to, $CaCl_2$, $CaBr_2$, MgO, CaOH, $NH_4Cl$, salicylate, naphthalene sulfonate, phthalate, and the like.

In most cases it appears the VES (compounds such as Aromox APA-T) is predominantly altered into a non-VES surfactant compound or chemical species, for instance, a surfactant species that is not able to form viscous micelles (elongated or work-like micelle structures) or it remains predominantly a surfactant that has lost the ability to form VES micelles. These theories are based on preliminary investigating and evaluating of the "residual material" that is sometimes left as a separate liquid phase after VES gel breaking occurs.

In some cases the altered VES may be the VES surfactant degraded to a hydrocarbon tail and a hydrophilic head. Thus, the term "decomposition" could be used for describing the breaking of the VES-gelled fluid, but "metal-mediated" and "alteration" of the VES are better terms for explaining the breaking phenomenon that occurs. As mentioned above, in most cases the VES compound is predominantly altered into a non-VES type surfactant. However, it may be understood that the surfactant (or surfactants or products) generated are not as soluble or as dispersible in water. That is, it has been found that the surfactant character of the products is overall less hydrophilic, and/or the Hydrophilic-Lipophilic Balance (HLB) appears to be altered, and the HLB number appears to be lower.

At this point it is still not clear what linkages or bonds are altered in the primary reactions that occur, whether the alteration occurs on the hydrocarbon tail or the surfactant head group. It is also uncertain what specific alterations occur, such as electron addition, electron removal, hydrogenation (electron and proton addition), dehydrogenation (electron and proton removal), and the like during the metal-mediated redox reactions. However, without being limited to any particular theory, it is suspected that the head group is the component that is chemically altered or modified. It is possible the head group is modified (by metal-mediated redox reactions) to have less solubility and/or dispersability in water, particularly brine (salt) water that is typically used for hydraulic fracturing operations.

The altered VES species appears to associate with the unaltered VES and as the ratio of altered to unaltered VES increases, a point is reached where the amount of altered VES present does not allow the unaltered VES surfactant to remain organized in worm-like or rod shaped viscous micelle structures, and thereby alters the micelle by rearrangement and a complete viscosity break is achieved. As long as the ratio of altered to unaltered VES remains relatively low the viscosity break that occurs is a uniphase fluid: a fluid that appears like water containing surfactants that do not yield viscosity, do not phase separate from the water, but give the water a slight color (such as straw yellow and light amber in some non-limiting cases) and the broken fluid easily foams when shaken in a bottle, and has a viscosity resembling water.

However, it has been observed that if the ratio of altered to unaltered VES becomes relatively high, such as when significant amounts of breaker products are used and very quick VES gel breaks are achieved, generating relatively high amounts of altered VES will result in the altered VES to phase out as a liquid from the water phase, and the unaltered VES portion also phases out with the altered portion. The phase separation seen from relatively fast VES gel break times appears to be due to a number of factors including, but not necessarily limited to, these listed which may act alone or in concert.

a. The amount of altered VES generated.
b. The apparent low HLB number of the altered VES species.
c. Due to the apparent low HLB number it appears the altered VES wants to associate more with itself (like an oil) than with water.
d. Low HLB number surfactants in general have less solubility and/or dispersability in water, particularly in brine water (i.e. water with dissolved salts present, such as KCl, NaCl, $CaCl_2$, $CaBr_2$, etc.).
e. It also appears that the ratio of altered to unaltered VES may come to a point where the amount of unaltered VES present is not able to act as a hydrotrope and keep the low HLB number surfactant in solution and/or dispersed in the water phase.
f. The unaltered VES phasing out with the altered VES surfactant species may possibly be due to the over abundance of altered VES surfactant species present combined with possibly having a strong attraction and interaction of the hydrocarbon tails that results in an oil-type break and surfactant liquid phasing out of the water phase.
g. Lab tests have shown that the liquid surfactant layer that may phase out with fast breaking fluid compositions when shaken in a bottle with the mix water brine will temporarily disperse within the mix water for several minutes to several hours, depending on the ratio of altered to unaltered VES within the fluid-liquid surfactant layer.

Solubilizing, dispersing, and/or stabilizing the altered and unaltered VES from phasing out of the water phase can be enhanced by the use of solvents and hydrotropes, such as: glycerol, ethylene glycol and other glycols, methanol and other alcohols, ethylene glycol monobutyl ether and other glycol ethers, ethoxylated alcohols, alkyl glucosides, alkyl aromatic sulfonates, and the like, and combinations thereof. Solubilizing additive packages can be formulated to have enhanced performance compared to single component solvent or hydrotrope additive use. One preferred synergistic additive package art is disclosed in U.S. patent application Ser. No. 11/430,655 filed May 9, 2006, incorporated herein by reference in its entirety.

The particular ratio of altered to unaltered VES appears to depend on a number of factors, some of which may have been identified. The ratio seems to depend primarily on the amount of breaker products used, more specifically the amount of both the reducing agent (if present) and the metal ions. The ratio appears to also depend on the fluid temperature, the type and amount of mix water salt VES loading, and the like, and combinations thereof.

Figure 1:
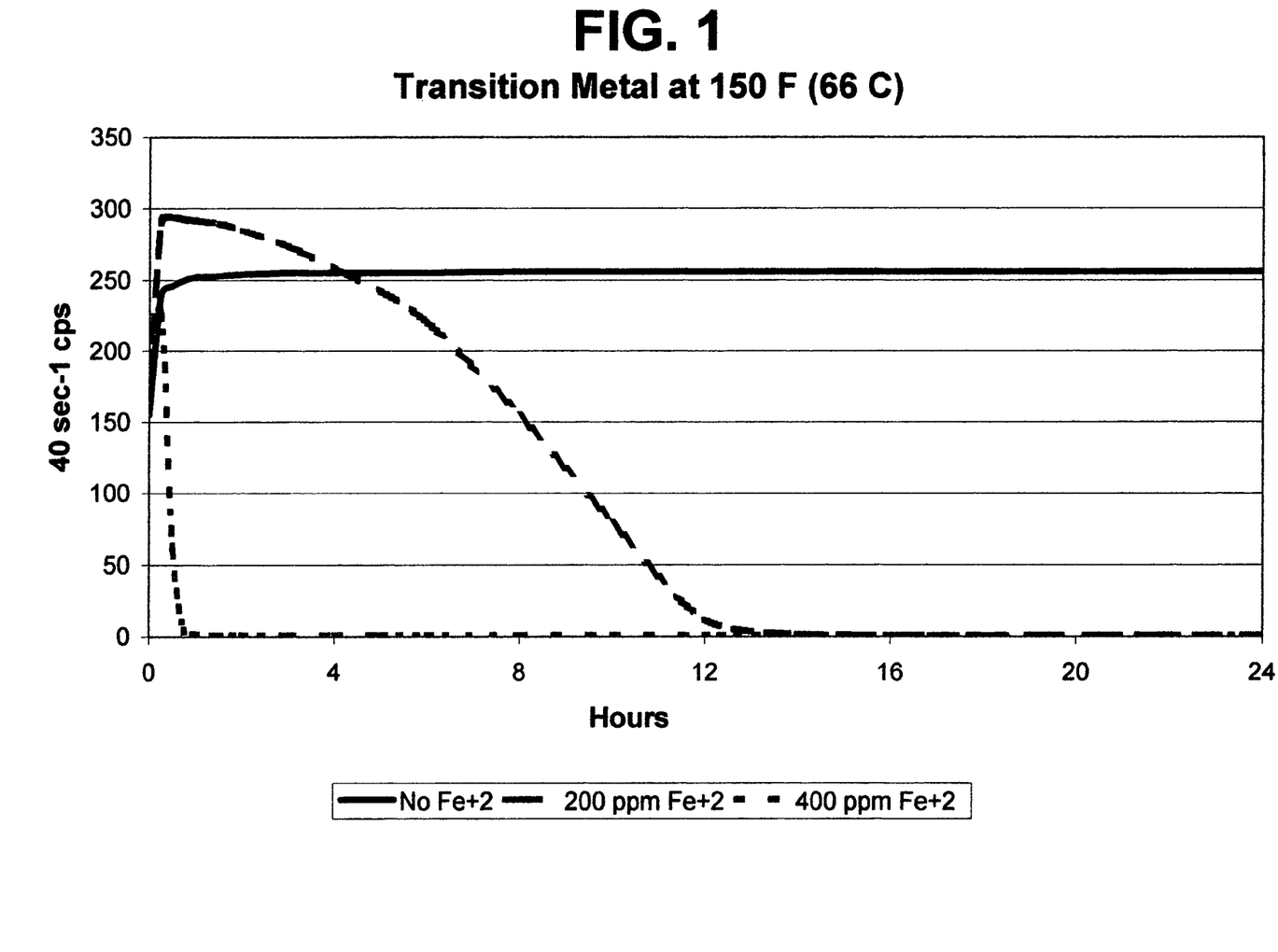
FIG. 1 is a graph of the viscosity of a 3% bw KCl aqueous fluid gelled with 4% bv WG-3L at 150° F. (66° C.) with no $Fe^{+2}$ transition metal, 200 ppm $Fe^{+2}$, and 400 ppm $Fe^{+2}$ demonstrating that the transition metal alone may break the gel.
Figure 2:
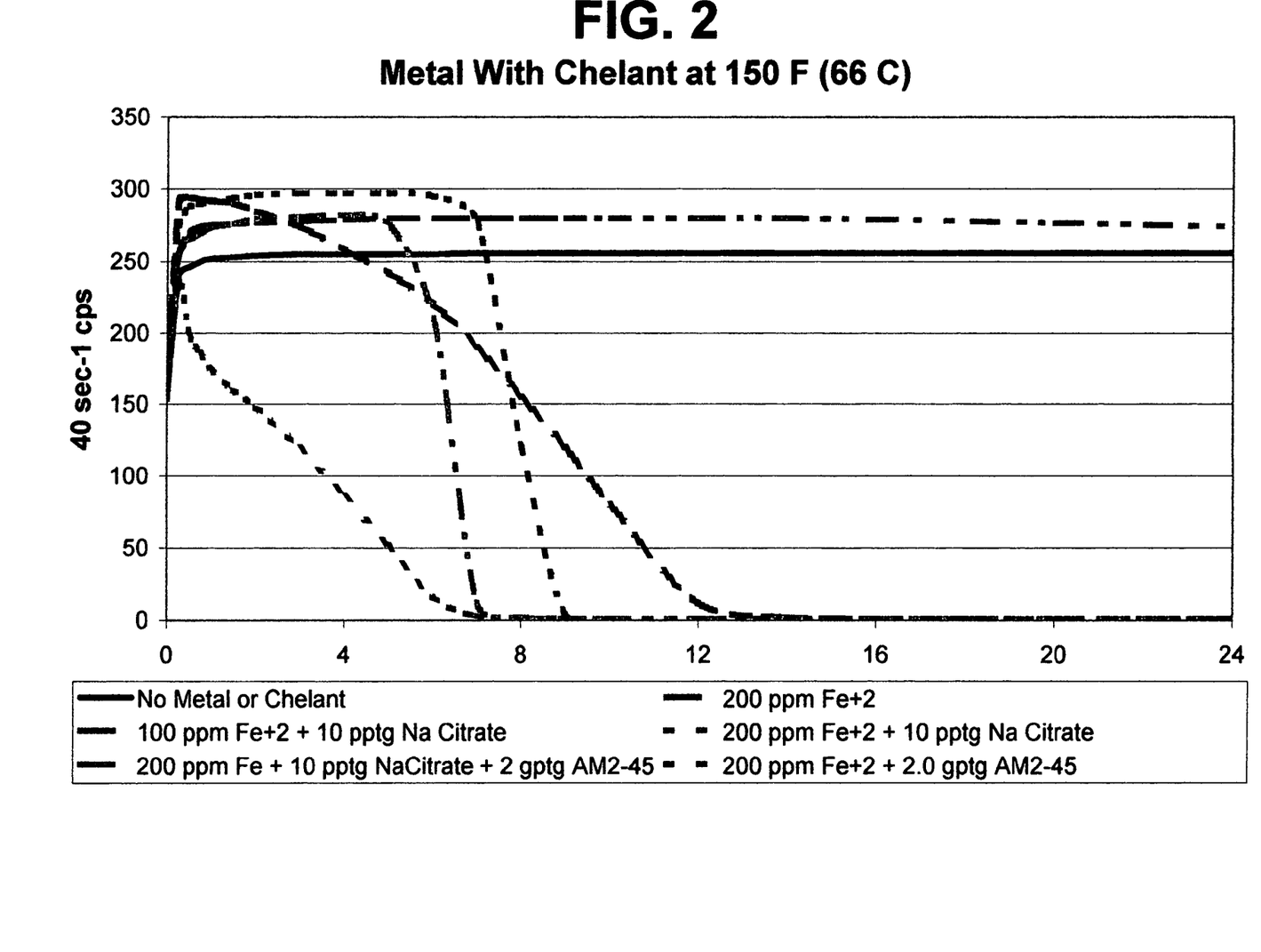
FIG. 2 is a graph of viscosity of a 3% bw KCl aqueous fluid gelled with 4% bv WG-3L at 150° F. (66° C.) with no metal or chelant compared with various levels of $Fe^{+2}$ transition metal with two different levels of two different chelants, Na citrate and AM2-45.
Figure 3:
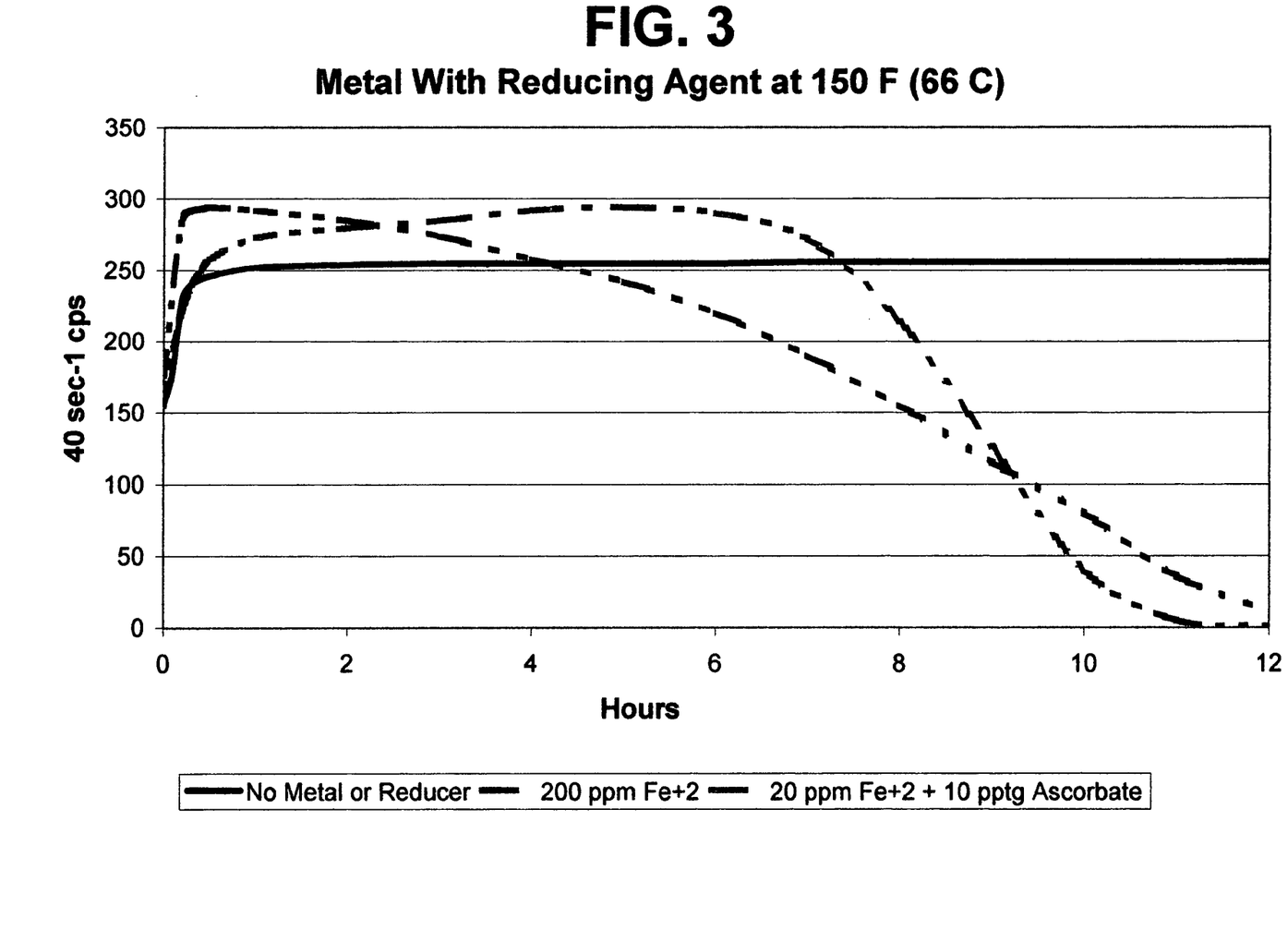
FIG. 3 is a graph of viscosity of a 3% bw KCl aqueous fluid gelled with 4% bv WG-3L at 150° F. (66° C.) using 200 ppm $Fe^{+2}$ transition metal alone compared with 20 ppm $Fe^{+2}$ and 10 pptg (1.2 kg/m$^3$) ascorbate reducing agent showing a sharper breaking profile with the latter.
Figure 7:
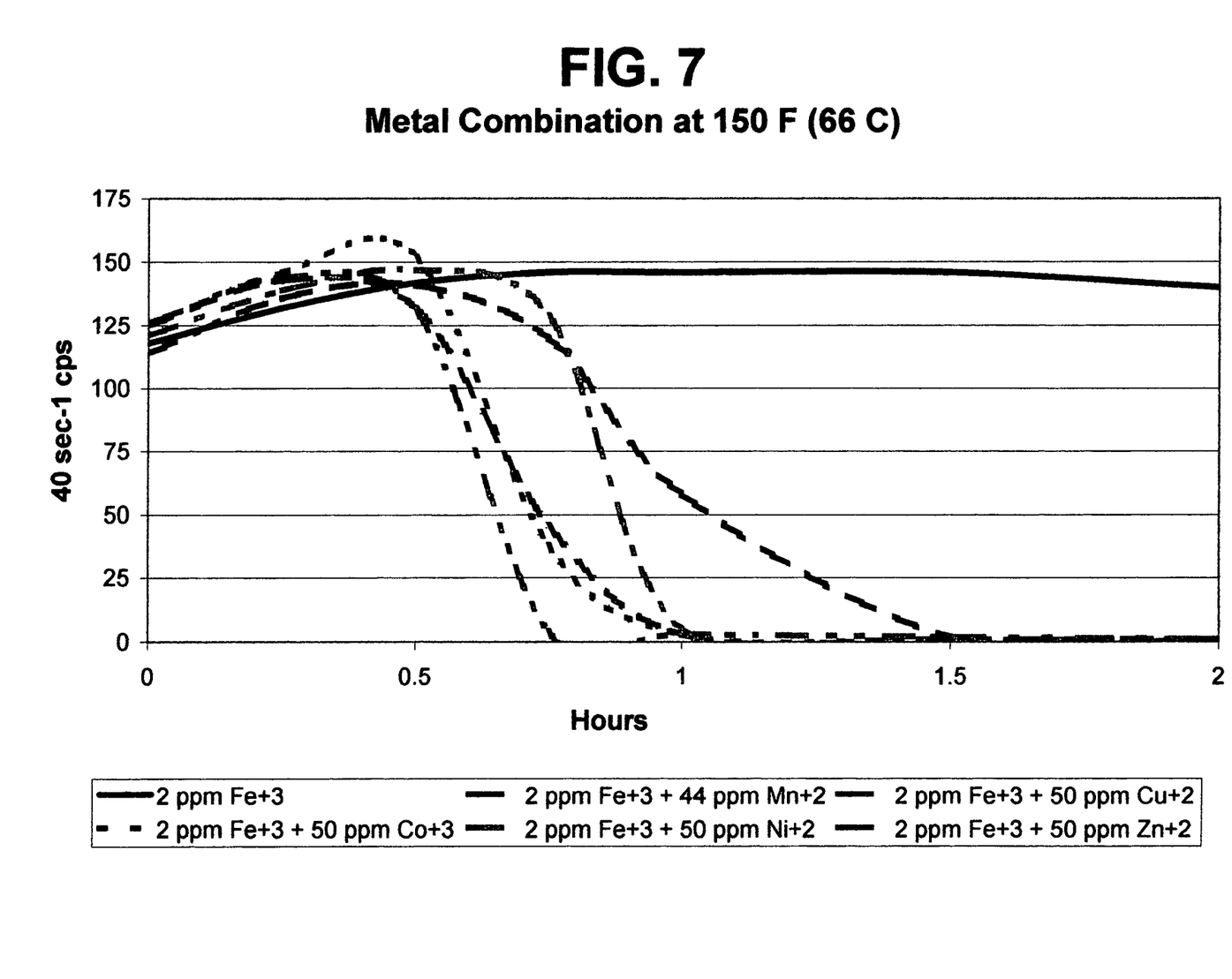
FIG. 7 is a graph of viscosity of a 3% bw KCl aqueous fluid gelled with 4% bv WG-3L at 150° F. (66° C.) with 2 ppm Fe+3 alone and together with varying amounts of a second metal ion showing breaking of the gel.
Figure 8:
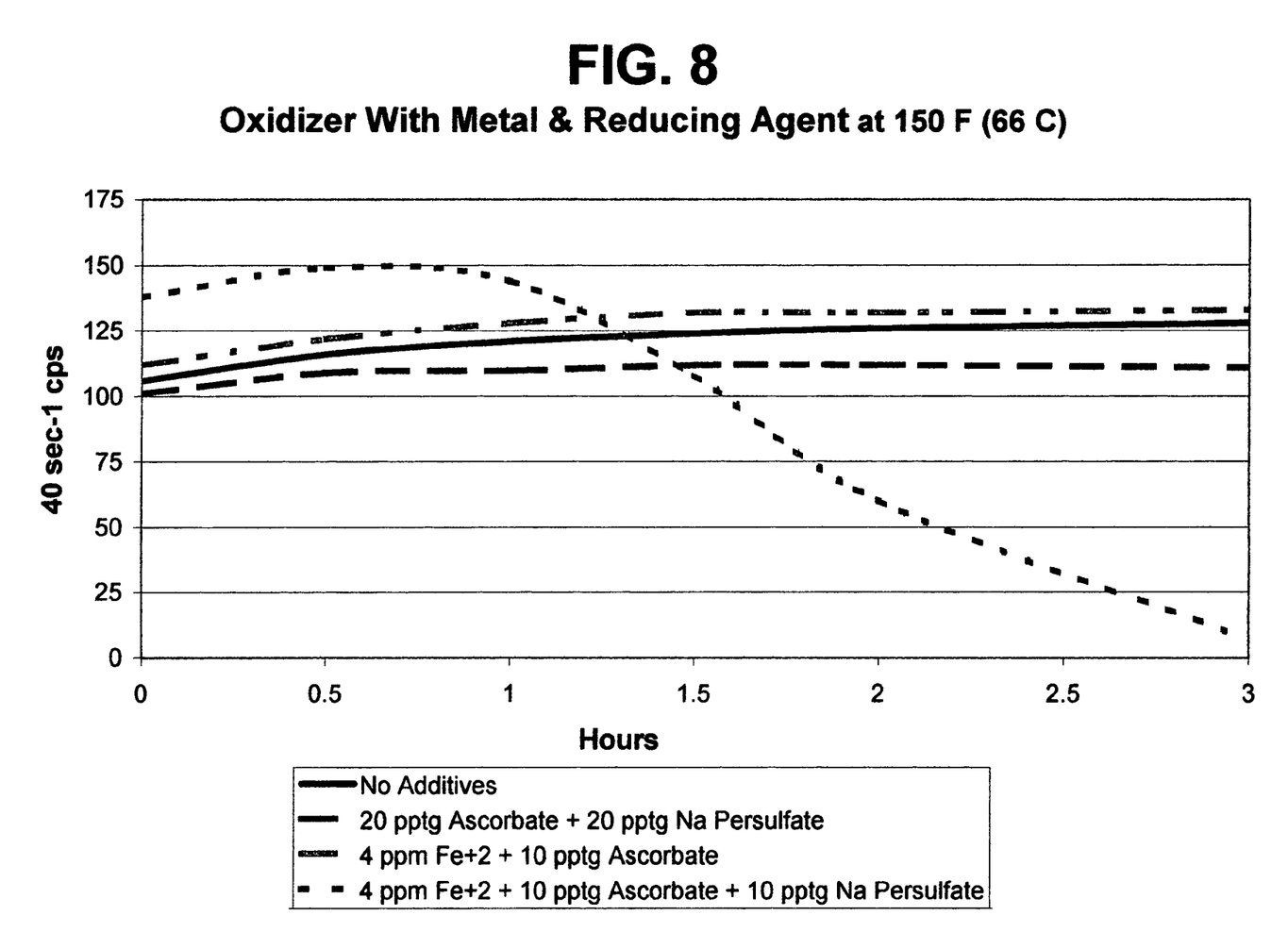
FIG. 8 is a graph of viscosity of a 3% bw KCl aqueous fluid gelled with 4% bv WG-3L at 150° F. (66° C.) demonstrating that an oxidizer (Na persulfate) together with a metal and optionally ascorbate reducing agent may also break a VES-gelled fluid.

The alteration of the VES (such as Aromox APA-T) thus appears to be metal-mediated or metal-catalyzed. That is, the reaction occurs due to the presence of a transition metal, as seen in the Examples of all FIGS. herein. Transition metals work alone at high enough metal concentrations, as seen in FIG. 1. Generally, transition metals work faster (the breaking rate is enhanced) when they are complexed with a chelant as seen in FIG. 2. The transition metal may also work faster (the breaking rate is enhanced) in the presence of a reducing agent, as shown in FIG. 3. It has been additionally discovered that the transition metal works significantly faster (the rate is significantly enhanced) with the synergistic combination of a chelant with reducing agent is used with the metal. This may be seen primarily in FIG. 4 that compares how the combination of a chelant with a reducing agent gave significantly shorter break time, thus providing evidence of synergism with such a combination. It has also been discovered that the rate can further be enhanced if more than one metal ion is used with the combination of a chelant and a reducing agent, as shown in FIG. 7. Further it has been found that an oxidizer can be activated by a metal and reducing agent combination as seen in FIG. 8. The data in FIG. 8 may show that the metal may be a catalyst to ascorbate and persulfate to generate free radical oxidation species, with such species then being the agents which act on altering the VES molecules. This data may thus show that the metal ions do not always have to be the agent itself acting on altering the VES directly, that is other redox alteration pathways that may be present that are metal-mediated, and which are within the methods and compositions herein.

The method thus employs a metal ion source. Surprisingly and unexpectedly, the use of a metal ion possibly acting as a catalyst, such as ferrous iron, alone does not give any early or rapid breaking effect at concentrations up to 240 ppm, and the use of an organic redox agent alone, such as 10.0 to 20.0 pptg sodium ascorbate, does not give any particular breaking effect alone either, but the use of both components together provide a full and complete and rapid breaking of the gel, and the use of a metal ion source alone at a high enough concentration may also break the gel.

Two preferred, but non-limiting, components of the inventive composition include ferrous chloride and sodium ascorbate. Controlled viscosity reduction rates can be achieved from 75° F. to about 300° F. (about 24° C. to about 149° C.). As noted, more than one transition metal can be combined and more than one redox and/or possibly hydrogenation-dehydrogenation agents can be combined. More than one transition metal ion refers to the combination of two or more different transition metal ions. The utilization of more than one transition metal and more than one redox agent and/or possibly hydrogenation-dehydrogenation agent may have applications in controlling possible secondary reactions, that is, further reactions involving the remaining or altered viscoelastic surfactant substrate and/or to the degraded surfactant by-products. Besides the use of more than one metal, addition of other agents may also be employed that may influence the primary reaction (viscosity reduction) and secondary reactions (alteration of by-products), with agents such as pH buffers, alcohols, amines, sugars, and the like, and mixtures thereof.

The use of the disclosed breaker system is ideal for controlled viscosity reduction of VES-based fracturing fluids. The breaking system may also be used for breaking gravel pack and loss circulation pill fluids composed of VES. This VES breaking method is a significant improvement in that it gives breaking rates for VES based fluids that the industry is accustomed to with conventional polymer based fracturing fluids, such as borate crosslinked guar.

In one non-limiting embodiment of the invention, the compositions herein will directly degrade or digest the gel created by a VES in an aqueous fluid, and alternatively will reduce the viscosity of the gelled aqueous fluid either directly, or by disaggregation or rearrangement of the VES micellar structure. However, the inventor does necessarily not want to be limited to any particular mechanism.

The composition of this invention includes at least one metal ion source where the goal is to deliver at least one metal ion to the VES-gelled system. The metal ion may be selected from metals including, but not necessarily limited to, Groups VA, VIA, VIIA, VIIIA, IB, IIB, IIIB and IVB of the Periodic Table (previous IUPAC American Group notation), such as iron, copper, manganese, cobalt, zinc, nickel, vanadium, platinum, tin, aluminum, molybdenum, platinum, palladium, and mixtures thereof. In one non-limiting embodiment of the invention, the metal ion source is a metal salt, such as ferrous chloride, or a carbonate or a hydroxide, in non-restrictive examples, and alternatively a metal complex. Other suitable, non-limiting sources include ferric chloride, ferrous gluconate, ferrous glucoheptonate, copper chloride, copper acetate, copper sulfate, cuprous chloride, cuprous nitrate, molybdenum acetate, palladium chloride, palladium nitrate, palladium acetate, nickel chloride, nickel acetate, nickel citrate, nickel formate, nickel gluconate, manganese gluconate, manganese glucoheptonate, manganese chloride, zinc glucoheptonate, zinc chloride, aluminum gluconate, aluminum sulfate, aluminum chloride and mixtures thereof.

Additionally, in another non-restrictive embodiment the metal ions may be complexed or chelated. Suitable sources for complexing and chelating agents include, but are not limited to, carboxylic acids, aminocarboxylic acids, polyols, alkanolamines, and the like. Examples of suitable carboxylic acids include, but are not limited to, fumaric acid, lactic acid, maleic acid, tartaric acid, citric acid, glucaric acid, gluconic acid, and the like. The carboxylic acids may be, and are preferred to be in salt form, for instance in particular non-restrictive examples such as sodium citrate, ammonium citrate, potassium fumarate, sodium gluconate, sodium glucoheptonate, and ammonium lactate. Examples of suitable aminocarboxylic acids include, but are not limited to, ethylenediaminetetraacetic acid (EDTA), hydroxyethylenediaminetriacetic acid (HEDTA), propylenediaminetetraacetic acid (PDTA), diethylenetriaminepentaacetic acid (DTPA), nitrilotriacetic acid (NTA), iminodisuccinic acid, amino acids, hydroxyethyliminodiacetic acid (HEIDA), and the like. Again, the aminocarboxylic acids may be, and in some cases is preferred to be in salt form, in non-restrictive examples as tetrasodium EDTA, trisodium NTA, and diammonium dihydrogen EDTA, sodium iminodisuccinate, and disodium HEIDA. Examples of suitable polyols include, but are not limited to, sorbitol, xylitol, mannitol, and the like. Examples of suitable alkanolamines include, but are not limited to diethanolamine, triethanolamine, and the like.

It is difficult, if not impossible, to specify with accuracy the amount of the various breaking components that should be added to a particular aqueous fluid gelled with viscoelastic surfactants to sufficiently or fully break the gel, in general. For instance, a number of factors affect this proportion, including but not necessarily limited to, the particular VES used to gel the fluid; the particular metal ion and metal ion source used; the particular chelant and particular chelant source used; the particular reducing agent and particular reducing agent source used; the temperature of the fluid; the downhole pressure of the fluid, the starting pH of the fluid;

and the complex interaction of these various factors. Nevertheless, in order to give an approximate feel for the proportions of the various breaking components to be used in the method of the invention, approximate ranges will be provided. The amount of elemental metal ion that may be effective in the invention may range from about 0.001 to about 500 ppm, based on the total amount of the fluid, irrespective of the amount of the metal ion source (e.g. gluconate, acetate, chloride, chloride dihydrate, etc. type sources). In another non-restrictive version of the invention, the amount of elemental metal ion may range from about 0.05 to about 400 ppm.

The second optional component is preferably a reducing agent which is from either an organic or inorganic source. Suitable reducing agent sources include, but are not necessarily limited to organic acids, organic acid salts, amines, alcohols, reducing sugars, ammonium compounds, nitrites, phosphites, sulfites, thiosulfates, thiols, hydrides, tocopherols, tocotrienols, quinones, and the like and mixtures thereof.

In one non-restrictive version of the invention, the optional organic acid used as a reducing agent is selected from the group consisting of citric acid, ascorbic acid, dehydroascorbic acid, benzoic acid, gluconic acid, lactic acid, erythorbic acid, formic acid, glycolic acid, oxalic acid, adipic acid, glutaric acid, succinic acid, acetic acid, propionic acid, caproic acid, maleic acid, fumaric acid, tartaric acid, cysteine, methionine, phthalic acid, and the like and mixtures thereof. In another non-restrictive embodiment of the invention, the organic acid source may be in an alkali or alkaline earth metal salt form. The salts of organic acids may include, but are not necessarily limited to citrates, acetates, ascorbates, erythorbates, benzoates, succinates, fumarates, maleates, and gluconates of alkali metals and alkaline earth metals. As mentioned, the organic acid is preferred to be in the alkali salt form or ammonium salt form in one non-restrictive case, for instance sodium citrate, potassium citrate, ammonium citrate, sodium erythorbate, sodium ascorbate, calcium ascorbate, sodium benzoate, sodium phthalate, diammonium phthalate, sodium gluconate, sodium acetate, sodium oxalate, and the like. The amount of organic acid salt that may be effective in the invention may range from about 1 to about 80 pptg (pounds per thousand gallons) based on the total amount of the aqueous fluid, irrespective of the amount of the organic acid source. In another non-restrictive version of the invention, the amount of organic acid may range from about 4 to about 40 pptg.

In one non-limiting embodiment of the invention, the reducing agent source may include, but is not necessarily limited to, sodium nitrite, sodium sulfite, sodium bisulfite, ammonium bisulfite, sodium thiosulfate, potassium thiosulfate, ammonium thiosulfate, sodium hydrosulfite, thiourea, hydrazine, sodium hydride, lithium hydride, sodium borohydride, lithium aluminum hydride, dithiothreitol, ethyl mercaptan, allyl mercaptan, anthraquinone, naphthoquinone, benzoquinone, glutathione, ethylenethiourea, tocopherols, tocotrienols, and other reducing agents known in the art may be utilized, and mixtures thereof. The amount of reducing agent that may be effective in the invention may range from about 0.2 to about 60 pptg based on the total amount of the aqueous fluid. In another non-restrictive version of the invention, the amount of reducing agent may range from about 0.5 to about 40 pptg.

In one non-limiting embodiment of the invention, the reducing sugars are selected from the group consisting of mono-, and disaccharides, and mixtures thereof. In another non-restrictive embodiment of the invention, the reducing sugars may include, but are not necessarily limited to glucose, fructose, mannose, galactose, maltose, lactose and xylose. The amount of reducing sugar that may be effective in the invention may range from about 2 to about 120 pptg based on the total amount of the aqueous fluid, irrespective of the amount of the reducing sugar source. In another non-restrictive version of the invention, the amount of reducing sugar of may range from about 5 to about 50 pptg.

In one non-limiting embodiment of the invention, the optional hydrogenation-dehydrogenation agent besides water is selected from the group consisting of aldehydes, ketones, alcohols, glycols, sugar alcohols, carbonates, phosphates, borohydrides, ammonium compounds, and the like and mixtures thereof. In another non-restrictive embodiment of the invention, the optional hydrogenation-dehydrogenation agent source may include, but are not necessarily limited to, acetaldehyde, propionaldehyde, butyraldehyde, cinnamaldehyde, acetone, methyl ethyl ketone, methyl isopropyl ketone, glycine, lysine, arginine, glutamine, ammonia, ammonium chloride, urea, tetramethylammonium chloride, choline, hexamethylene diamine, triethylene glycol diamine, methanol, isopropanol, ethanol, hexanol, glycerol, propylene glycol, tripropylene glycol, diethylene glycol, disodium hydrogen phosphate, sodium dihydrogen phosphate, ammonium dihydrogen phosphate, boric acid, sodium borate, sodium-calcium borate, sodium carbonate, sodium bicarbonate, sodium sesquicarbonate, sodium borohydride, sodium hydride, lithium aluminum hydride, and the like. The amount of hydrogenation-dehydrogenation agent that may be effective in the invention may range from about 1 to about 100 pptg based on the total amount of the aqueous fluid, irrespective of the amount of the hydrogenation-dehydrogenation agent. In another non-restrictive version of the invention, the amount of hydrogenation-dehydrogenation agent may range from about 5 to about 50 pptg.

Optionally, one or more suitable conventional or future oxidizing agents useful for catalytic redox reactions with viscoelastic surfactant molecules may also be employed in the breaking composition of this invention. Appropriate oxidizers include, but are not necessarily limited to, alkali metals and alkaline earth metals of persulfates, percarbonates, perborates, peroxides, hydroperoxides, bromates, bromides, hypochlorites, chlorites, perchlorates, periodates, permanganates, perphosphates, hydrogen peroxide, and the like and mixtures thereof. The amount of oxidizer that may be effective in the invention may range from about 0.5 to about 100 pptg based on the total amount of the aqueous fluid. In another non-restrictive version of the invention, the amount of oxidizer may range from about 2 to about 50 pptg.

An optional additional component of the breaking composition of this invention is an organic compound that slowly hydrolyzes upon fluid heating into a Brønsted-Lowry acid as an organic hydrogenation source. These organic compounds, which may typically include organic acids, may include, but are not necessarily limited to, citric acid esters, fumaric acid esters, acetic acid esters, and the like. The specific organic compounds include, but are not limited to, ethyl acetate, ethyl acetoacetate, triethyl citrate, tributyl citrate, and diethyl fumarate. The amount of organic acid that may be effective in the invention may range from about 0.2 to about 8 gptg based on the total amount of the aqueous fluid. In another non-restrictive version of the invention, the amount of organic acid may range from about 0.5 to about 4 gptg.

Any suitable mixing apparatus may be used for this procedure. In the case of batch mixing, the VES and the aqueous fluid are blended for a period of time sufficient to form a gelled or viscosified solution. The VES that is useful in the present invention can be any of the VES systems that are familiar to those in the well service industry, and may include, but are not limited to, amines, amine salts, quaternary ammonium salts, amidoamine oxides, amine oxides, mixtures thereof and the like. Suitable amines, amine salts, quaternary ammonium salts, amidoamine oxides, and other surfactants are described in U.S. Pat. Nos. 5,964,295; 5,979,555; and 6,239,183, incorporated herein by reference.

Viscoelastic surfactants improve the fracturing (frac) fluid performance through the use of a polymer-free system. These systems offer improved viscosity breaking, higher sand transport capability, are more easily recovered after treatment, and are relatively non-damaging to the reservoir. The systems are also more easily mixed "on the fly" in field operations and do not require numerous co-additives in the fluid system, as do some prior systems.

The viscoelastic surfactants suitable for use in this invention include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents $RN^+(R')_2O^-$ may have the following structure (I):

(I)

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amidoamine oxide gelling agent is Akzo Nobel's Aromox APA-T formulation, which should be understood as a dipropylamine oxide since both R' groups are propyl.

Materials sold under U.S. Pat. No. 5,964,295 include ClearFRAC™, which may also comprise greater than 10% of a glycol. One preferred VES is an amine oxide. As noted, a particularly preferred amine oxide is APA-T, sold by Baker Oil Tools as SurFRAQ™ VES. SurFRAQ is a VES liquid product that is 50% APA-T and 40% propylene glycol. These viscoelastic surfactants are capable of gelling aqueous solutions to form a gelled base fluid. The additives of this invention may also be used in Diamond FRAQ™ which is a VES system, similar to SurFRAQ, sold by Baker Oil Tools.

The invention covers commonly known materials as Aromox APA-T manufactured by Akzo Nobel and other known viscoelastic surfactant gelling agents common to stimulation treatment of subterranean formations.

The amount of VES included in the fracturing fluid depends on at least two factors. One involves generating enough viscosity to control the rate of fluid leak off into the pores of the fracture, and the second involves creating a viscosity high enough to keep the proppant particles suspended therein during the fluid injecting step, in the non-limiting case of a fracturing fluid. Thus, depending on the application, the VES is added to the aqueous fluid in concentrations ranging from about 0.5 to 25% by volume, alternatively up to about 12 vol % of the total aqueous fluid (from about 5 to 120 gallons per thousand gallons (gptg)). In another non-limiting embodiment, the range for the present invention is from about 1.0 to about 6.0% by volume VES product. In an alternate, non-restrictive form of the invention, the amount of VES ranges from 2 to about 10 volume %.

It is expected that the breaking compositions of this invention can be used to reduce the viscosity of a VES-gelled aqueous fluid regardless of how the VES-gelled fluid is ultimately utilized. For instance, the viscosity breaking compositions could be used in all VES applications including, but not limited to, VES-gelled friction reducers, VES viscosifiers for loss circulation pills, fracturing fluids, gravel pack fluids, viscosifiers used as diverters in acidizing, VES viscosifiers used to clean up drilling mud filter cake, remedial clean-up of fluids after a VES treatment (post-VES treatment), and the like.

A value of the invention is that a fracturing or other fluid can be designed to have enhanced breaking characteristics. Importantly, better clean-up of the VES fluid from the fracture and wellbore can be achieved thereby. Better clean-up of the VES directly influences the success of the fracture treatment, which is an enhancement of the well's hydrocarbon productivity.

In order to practice the method of the invention, an aqueous fracturing fluid, as a non-limiting example, is first prepared by blending a VES into an aqueous fluid. The aqueous fluid could be, for example, water, brine, aqueous-based foams or water-alcohol mixtures. Any suitable mixing apparatus may be used for this procedure. In the case of batch mixing, the VES and the aqueous fluid are blended for a period of time sufficient to form a gelled or viscosified solution. Alternatively, the breaking composition of this invention may be added separately.

Propping agents are typically added to the base fluid after the addition of the VES. Propping agents include, but are not limited to, for instance, quartz sand grains, glass and ceramic beads, bauxite grains, walnut shell fragments, aluminum pellets, nylon pellets, and the like. The propping agents are normally used in concentrations between about 1 to 14 pounds per gallon (120-1700 kg/m³) of fracturing fluid composition, but higher or lower concentrations can be used as the fracture design required. The base fluid can also contain other conventional additives common to the well service industry such as water wetting surfactants, non-emulsifiers and the like. As noted, in this invention, the base fluid can also contain other non-conventional additives which can contribute to the breaking action of the VES fluid, and which are added for that purpose.

Any or all of the above metal ion sources and/or organic and/or inorganic redox agent sources and/or hydrogenation-dehydrogenation agent sources, chelating agents, organic acids, etc. may be provided in an extended release form such as encapsulation by polymer or otherwise, pelletization with binder compounds, absorbed or some other method of layering on a microscopic particle or porous substrate, and/or a combination thereof. Specifically, the sources may be encapsulated to permit slow or timed release thereof. In non-limiting examples, the coating material may slowly dissolve or be removed by any conventional mechanism, or the coating could have very small holes or perforations therein for the bio-products within to diffuse through slowly. For instance, polymer encapsulation coatings such as used in fertilizer technology available from Scotts Company, specifically POLY-S® product coating technology, or polymer encapsulation coating technology from Fritz Industries could possibly be adapted to the methods of this invention. The sources could also be absorbed onto zeolites, such as Zeolite A, Zeolite 13X, Zeolite DB-2 (available from PQ Corporation, Valley Forge, Pa.) or Zeolites Na-SKS5, Na-SKS6, Na-SKS7, Na-SKS9, Na-SKS10, and Na-SKS13, (available from Hoechst Aktiengesellschaft, now an affiliate of Aventis S.A.), and other porous solid substrates such as MICROSPONGE™ (available from Advanced Polymer Systems, Redwood, Calif.) and cationic exchange materials such as bentonite clay or microscopic particles such as carbon nanotubes or buckminster fullerenes. Further, the component sources may be both absorbed into and onto porous substrates and then encapsulated or coated, as described above.

In a typical fracturing operation, the fracturing fluid of the invention is pumped at a rate sufficient to initiate and propagate a fracture in the formation and to place propping agents into the fracture. A typical fracturing treatment would be conducted by mixing a 20.0 to 60.0 gallon/1000 gal water (volume/volume—the same values may be used with any SI volume unit, e.g. 60.0 liters/–1000 liters) amine oxide VES, such as SurFRAQ, in a 2% (w/v) (166 lb/1000 gal, 19.9 kg/m$^3$) KCl solution at a pH ranging from about 6.0 to about 8.0. The breaking components are added after the VES addition, or in a separate step after the fracturing operation is complete.

In one embodiment of the invention, the method of the invention is practiced in the absence of gel-forming polymers and/or gels or aqueous fluid having their viscosities enhanced by polymers.

The present invention will be explained in further detail in the following non-limiting Examples that are only designed to additionally illustrate the invention but not narrow the scope thereof.

GENERAL PROCEDURE FOR EXAMPLES 1-8

To a blender were added tap water, 3 wt % KCl, followed by 3 vol % viscoelastic surfactant (WG-3L—Aromox® APA-T from Akzo Nobel). The blender was used to mix the components on a very slow speed, to prevent foaming, for about 15 minutes to viscosify the VES fluid. Mixed samples were then placed into plastic bottles. Various components singly or together, in various concentrations, were then added to each sample, and the sample was shaken vigorously for 60 seconds. The samples were placed in a water bath at the indicated temperature and visually observed every 30 minutes for viscosity reduction difference between the samples. Since a goal of the research was to find a relatively rapid gel breaking composition, samples were only observed for 24 hours or less.

Viscosity reduction can be visually detected. Shaking the samples and comparing the elasticity of gel and rate of air bubbles rising out of the fluid can be used to estimate the amount of viscosity reduction observed. Measurements using a Fann 35 rheometer at 100 rpm can also be used to acquire quantitative viscosity reduction of each sample.

Example 1

The results of Example 1 comparing no $Fe^{+2}$ with 200 ppm $Fe^{+2}$ and 400 ppm $Fe^{+2}$ are shown in FIG. 1. The source of the $Fe^{+2}$ was ferrous chloride. No other breaker components were added. This Example shows that a transition metal alone can readily break a VES-gelled fluid, either slowly or very quickly proportional to the amount of metal used. Unless otherwise noted, Examples 7-14 use a base fluid composition of tap water including 3% bw KCl and 4% bv WG-3L viscoelastic surfactant.

Example 2

The results of Example 2 shown in FIG. 2 demonstrates that breaking rate can be enhanced by use of a chelant, and that the breaking profile (viscosity over time) can be altered and also enhanced by the type of chelant used. Test results with AM2-45 present show some chelants can give stable initial viscosity followed by very sharp breaking rate (viscosity reduction). The DISSOLVINE AM2-45 is a EDTA-$(NH_4)_2H_2$ chelant available from Akzo Nobel. The data within FIG. 2 show that metal-mediated viscosity reduction can be enhanced by the addition of a combination of chelants or use of a one particular type.

Example 3

The data from Example 3 plotted in FIG. 3 demonstrates that less amount of metal is required for VES viscosity break when activated by a reducing agent such sodium ascorbate. Note that the amount of $Fe^{+2}$ was decreased by a factor of 10 when the sodium ascorbate was used.

Example 4

Figure 4:
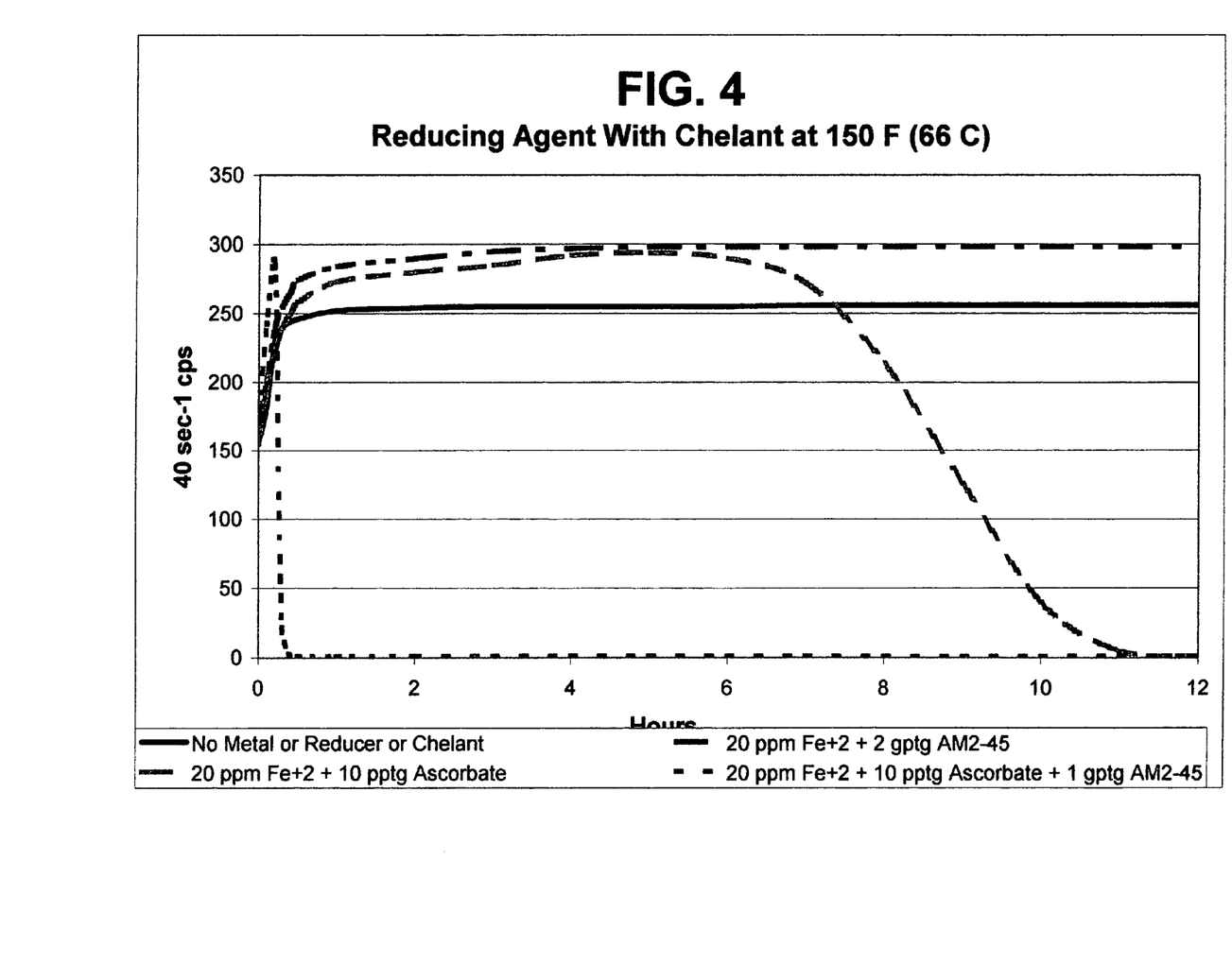
FIG. 4 is a graph of viscosity of a 3% bw KCl aqueous fluid gelled with 4% bv WG-3L at 150° F. (66° C.) employing 20 ppm $Fe^{+2}$ and 2 gptg AM2-45 giving no breaking, some breaking effect starting at 4 hours with 20 ppm $Fe^{+2}$ and 10 pptg (1.2 kg/m$^3$) ascorbate, contrasted with 20 ppm $Fe^{+2}$ and 10 pptg (1.2 kg/m$^3$) ascorbate together with 1 gptg AM2-45 chelant giving sharp breaking in about 0.5 hour.

FIG. 4 presents the results from Example 4 showing synergistic breaking of VES occurs when combining with the transition metal a chelant (AM2-45) and a reducing agent (sodium ascorbate), as shown by the line of short dashes demonstrating a very quick break.

Example 5

Figure 5:
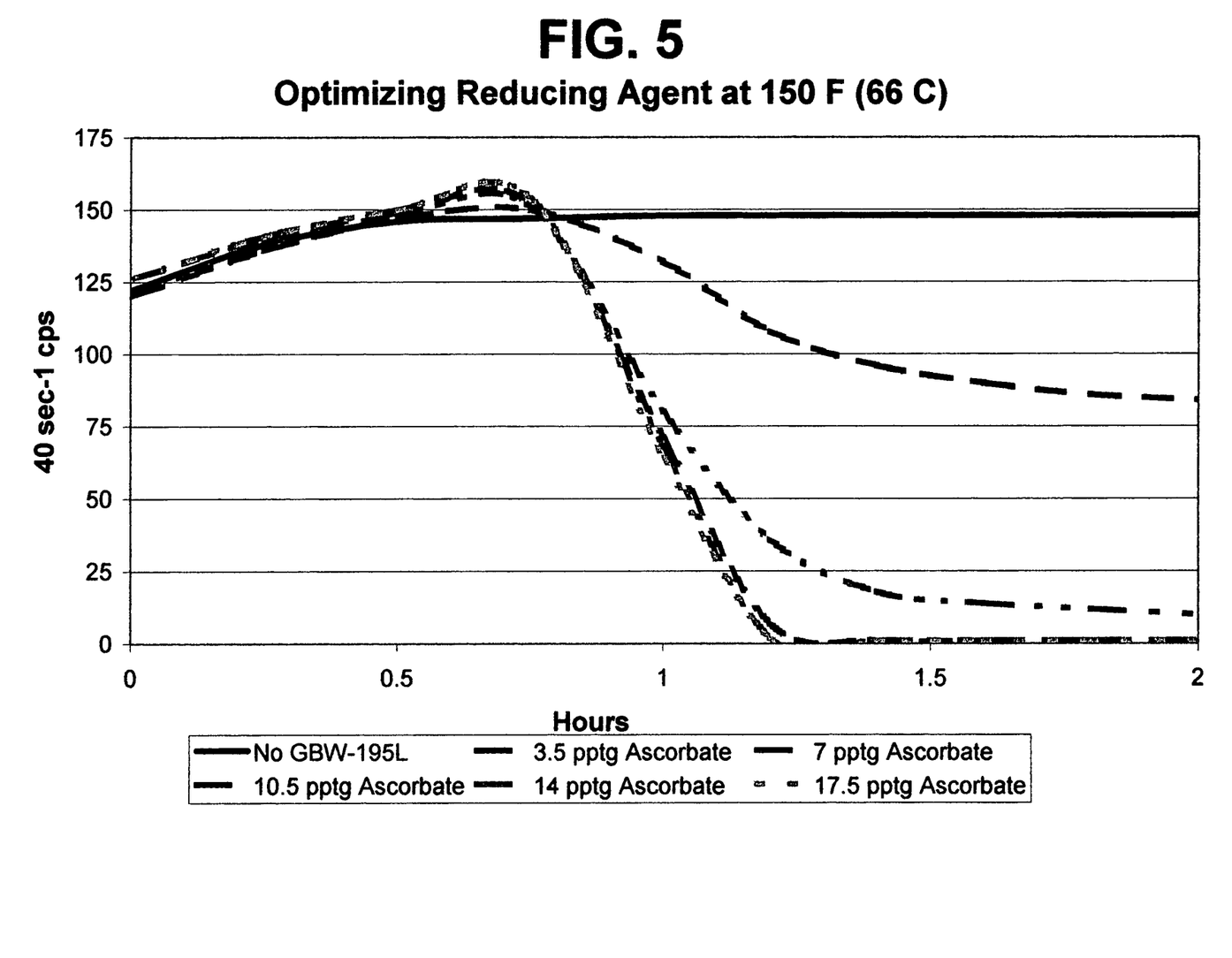
FIG. 5 is a graph of viscosity of a 3% bw KCl aqueous fluid gelled with 4% bv WG-3L at 150° F. (66° C.) with various levels of ascorbate reducing agent only to optimize the levels showing generally breaking increased with increasing ascorbate levels until the last two tried: 3.5 pptg (0.42 kg/m$^3$), 7 pptg (0.84 kg/m$^3$), 10.5 pptg (1.3 kg/m$^3$), 14 pptg (1.7 kg/m$^3$) and 17.5 pptg (2.1 kg/m$^3$)

FIG. 5 shows the results of Example 5 that once an adequate amount of metal and chelant is present the amount of reducing agent can be optimized. Note how once enough reducing agent (sodium ascorbate) is present that no increase in breaking rate occurs with extra amounts added (i.e. no appreciable difference between 10.5 pptg (1.3 kg/m$^3$), 14 pptg (1.7 kg/m$^3$) and 17.5 pptg (2.1 kg/m$^3$)).

GBW-197L is an aqueous solution composed of four transition metals with three chelants. The total metal content is about 5 wt %.

Example 6

Figure 6:
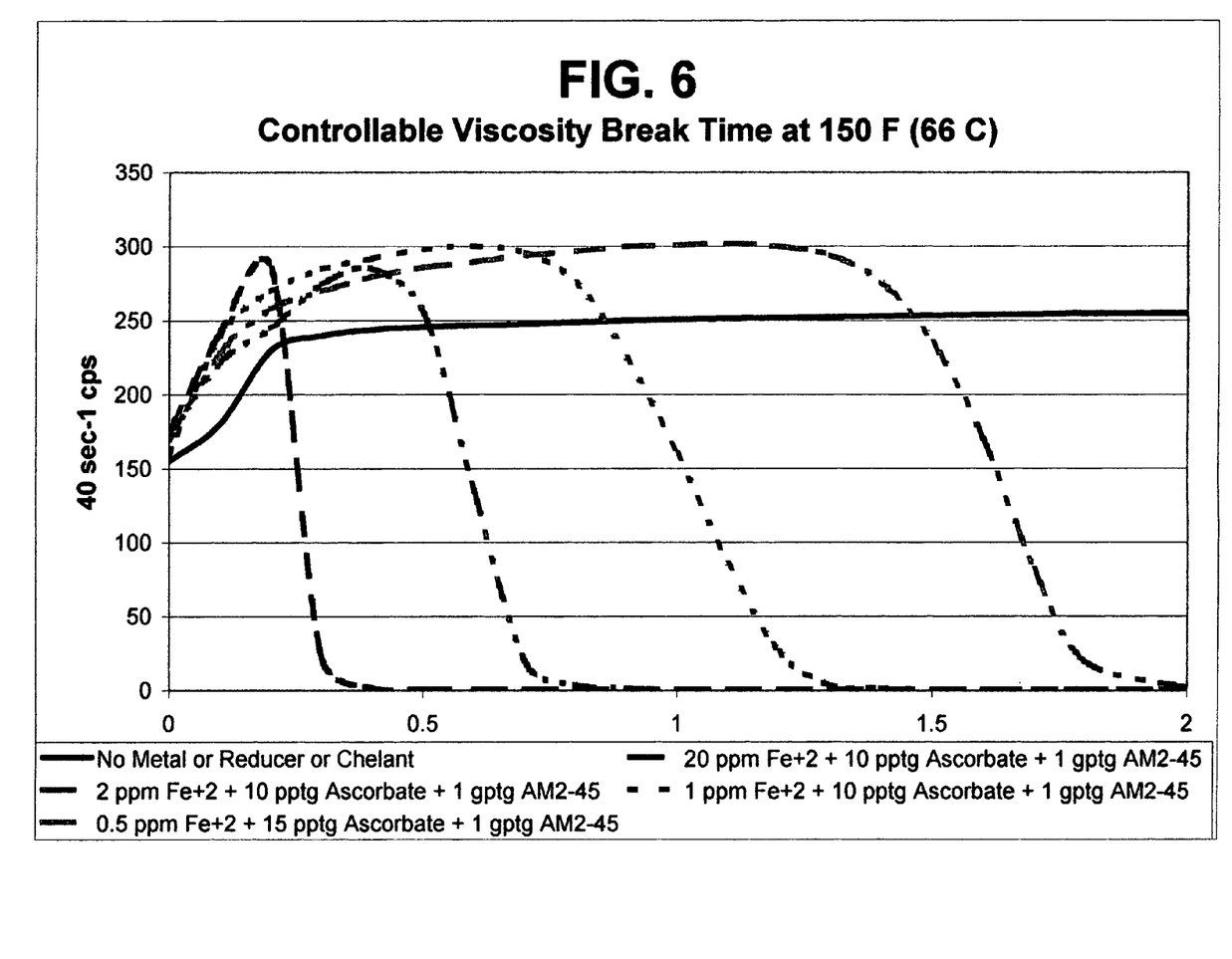
FIG. 6 is a graph of viscosity of a 3% bw KCl aqueous fluid gelled with 4% bv WG-3L at 150° F. (66° C.) with various levels of ascorbate reducing agent and 1 gptg AM2-45 chelating agent demonstrating how the viscosity break time of a VES fluid may be adjusted by varying the amount of metal.

The data from Example 6 are graphed in FIG. 6 and demonstrate that with adequate amounts of chelant and reducing agent present the viscosity break time of a VES fluid can be adjusted by varying the amount of metal. Note how with synergistic combination of chelant and reducing agent that very little metal is required to obtain fast gel breaks—amounts of 2, 1, and even 0.5 ppm $Fe^{+2}$ (from ferrous chloride).

Example 7

FIG. 7 presents the data from Example 7 which show that use of more than one metal source can be used to enhance the rate of VES-gel break. Note how the select ratio and amount of metals tested shows similar enhanced breaking rates, with each metal combination showing some distinction in the particular breaking profile.

In this Example, the Base Fluid Composition was 3% bw KCl, 3% bv WG-3L, 10 pptg Ascorbate, with the balance as tap water. The $Fe^{+3}$ source was D-Fe-6 (Akzo Nobel Dissolvine DTPA-$Fe^{+3}(NH_4)_2$ product). The ascorbate was sodium ascorbate. The $Mn^{+2}$ was from E-Mn-6 (Akzo Nobel Dissolvine $MnK_2$ EDTA product). The $Cu^{+2}$ was from E-Cu-15 (Akzo Nobel Dissolvine $CuNa_2$ EDTA product). The $Co^{+3}$ was from reagent $CoCl_3$ complexed with Akzo Nobel Dissolvine AM2-45. The $Ni^{+2}$ was from reagent $NiCl_2$ complexed with Akzo Nobel Dissolvine AM2-45. The $Zn^{+2}$ was from reagent $ZnCl_2$ complexed with Akzo Nobel Dissolvine AM2-45.

Example 8

FIG. 8 presents the data from Example 8 showing that an oxidizer can further activate a metal and reducing agent combination for improved VES gel breaking. The oxidizer was sodium persulfate.

Overall, the Examples 1-8 (FIGS. 1-8) show a single transition metal can be used to break VES gel, and that the rate of breaking can be enhanced by use of one of several optional activating agents. Of particular utility is the synergistic combination of a chelant and reducing agent with one or more transition metals. Multiple agents can be used with a metal to control when and how fast a VES gelled-fluid will break. In all multiple agent combinations the rate of break can be varied by adjusting the amount of metal or metals used providing significant control over the breaking procedure.

A summary of what has been discovered herein relating to VES-gel breaking technology includes, but is not necessarily limited to:
  a. that a metal ion alone may be used;
  b. that metal-mediated VES-gel breaking can be enhanced by use of a chelating agent;
  c. that metal-mediated VES-gel breaking can be additionally enhanced by use of a reducing agent;
  d. that metal-mediated VES-gel breaking can be substantially enhanced by use of a combination of a chelating agent and a reducing agent; and
  e. that metal-mediated VES-gel breaking can be further enhanced by use of two or more transition metal agents.

As previously discussed, it is possible that the breaker system herein works by one or more redox reactions. These reactions may or may not explain the breaking mechanisms at work in the technology described herein, and the inventors do not wish to be limited to any particular explanation. Further, it is possible that two or more breaking methods participate at the same time or sequentially in the VES alteration-degradation herein. The reactions that alter the VES compound to a non-VES compound are viewed as the primary reactions that may occur. Secondary reactions with the non-VES compounds generated may occur under conditions including, but not necessarily limited to:
  a. when more than one metal ion is present;
  b. when more than one chelant is present;
  c. when more than one reducing agent is present;
  d. when pH buffers are used; and
  e. when other agents are present that may influence or participate in any additional alteration of the non-VES compounds In the foregoing specification, the invention has been described with reference to specific embodiments thereof, and has been demonstrated as effective in providing methods and compositions for a VES fracturing fluid breaker mechanism. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of viscoelastic surfactants, metal ions, metal ion sources, organic and inorganic redox agents, organic and inorganic redox agent sources, organic and inorganic hydrogenation-dehydrogenation agents, organic and inorganic hydrogenation-dehydrogenation agent sources, chelating agents, hydrolyzing organic acids, and other components falling within the claimed parameters, but not specifically identified or tried in a particular composition or fluid, are anticipated to be within the scope of this invention.

I claim:

1. A method for breaking viscosity of aqueous fluids gelled with a viscoelastic surfactant (VES) comprising adding to an aqueous fluid gelled with at least one amidoamine oxide VES in an amount effective to increase the viscosity of the aqueous fluid, a composition in an amount effective to reduce the viscosity of the gelled aqueous fluid, where the composition comprises from about 0.01 to about 300 ppm, based on the total fluid of at least one transition metal ion source.

2. The method of claim 1 where the composition further comprises at least one chelating agent.

3. The method of claim 2 where the composition further comprises at least one reducing agent source.

4. The method of claim 3 where the reducing agent source is selected from the group consisting of erythorbates, dehydroascorbates, citrates, ascorbates, sulfites, thiols, and alkali metal, alkaline earth metal and ammonium salts thereof.

5. The method of claim 2 where the chelating agent is selected from the group consisting of carboxylic acids, aminocarboxylic acids, polyols, alkanolamines, and combinations thereof.

6. The method of claim 2 where the amount of chelating agent ranges from about 0.1 to about 50 pptg (about 0.012 to about 6 kg/m$^3$), based on the total fluid.

7. The method of claim 1 where the transition metal ion source is a transition metal salt or transition metal complex.

8. The method of claim 7 where the transition metal in the transition metal salt or transition metal complex is a transition metal selected from the group consisting of Groups VA, VIA, VIIA, VIIIA, IB, IIB, IIIB, and IVB of the Periodic Table (previous IUPAC American Group notation).

9. The method of claim 1 where the composition further comprises at least two transition metal ion sources.

10. The method of claim 1 where the composition reduces the viscosity of the gelled aqueous fluid by disaggregating or rearranging a micelle structure of the VES.

11. The method of claim 1 where the composition reduces the viscosity of the gelled aqueous fluid by chemically altering an effective amount of the VES required to increase the viscosity of the aqueous fluid.

12. A method for breaking viscosity of aqueous fluids gelled with a viscoelastic surfactant (VES) comprising adding to an aqueous fluid gelled with at least one amidoamine oside VES in an amount to increase the viscosity of the gelled aqueous fluid, where the composition comprises:
  from about 0.01 to about 300 ppm, based on the total fluid of at least one transition metal ion source;
  at least one chelating agent; and
  at least one reducing agent source;

where the composition reduces the viscosity of the gelled aqueous fluid by a mechanism selected from the group consisting of disaggregating a micelle structure of the VES, rearranging a micelle structure of the VES, chemically altering an effective amount of the VES, and combinations thereof.

13. The method of claim 12 where the transition metal ion source is a transition metal salt or transition metal complex.

14. The method of claim 13 where the transition metal in the transition metal salt or transition metal complex is a transition metal selected from the group consisting of Groups VA, VIA, VIIA, VIIIA, IB, IIB, IIIB, and IVB of the Periodic Table (previous IUPAC American Group notation).

15. The method of claim 12 where the chelating agent is selected from the group consisting of carboxylic acids, aminocarboxylic acids, polyols, alkanolamines, and combinations thereof.

16. The method of claim 12 where the reducing agent source is an organic acid salt selected from the group consisting of erythorbates, dehydroascorbates, citrates, ascorbates, sulfites, thiols, and alkali metal, alkaline earth metal andammonium salts thereof.

17. The method of claim 12 where
the amount of reducing agent source ranges from about 5 to about 50 pptg (about 0.6 to about 6 kg/m$^3$), based on the total fluid; and
the amount of chelating agent ranges from about 0.1 to about 50 pptg (about 0.012 to about 6 kg/m$^3$),
based on the total fluid.

18. An aqueous fluid comprising:
water;
at least one amidoamine oxide viscoelastic surfactant (VES) in an amount effective to increase the viscosity of the aqueous fluid; and
a composition in an amount from about 0.01 to about 300 ppm, based on the total fluid, to reduce the viscosity of the gelled aqueous fluid, where the composition comprises at least one transition metal ion source.

19. The aqueous fluid of claim 18 where the composition further comprises at least one chelating agent.

20. The aqueous fluid of claim 19 where the composition further comprises at least one reducing agent source.

21. The aqueous fluid of claim 20 where the reducing agent source is selected from the group consisting of erythorbates, dehydroascorbates, citrates, ascorbates, sulfites, thiols, and alkali metal, alkaline earth metal and ammonium salts thereof.

22. The aqueous fluid of claim 19 where the chelating agent is selected from the group consisting of carboxylic acids, aminocarboxylic acids, polyols, alkanolamines, and combinations thereof.

23. The aqueous fluid of claim 19 where the amount of chelating agent ranges from about 0.1 to about 50 pptg (about 0.012 to about 6 kg/m$^3$), based on the total fluid.

24. The aqueous fluid of claim 18 where the composition further comprises at least two transition metal ion sources.

25. The aqueous fluid of claim 18 where the composition reduces the viscosity of the gelled aqueous fluid by disaggregating or rearranging a micelle structure of the VES.

26. The aqueous fluid of claim 18 where the composition reduces the viscosity of the gelled aqueous fluid by chemically altering an effective amount of the VES required to increase the viscosity of the aqueous fluid.

27. The aqueous fluid of claim 18 where the transition metal ion source is a transition metal salt or transition metal complex.

28. The aqueous fluid of claim 27 where the transition metal in the transition metal salt or transition metal complex is a transition metal selected from the group consisting of Groups VA, VIA, VIIA, VIIIA, IB, IIB, IIIB, and IVB of the Periodic Table (previous IUPAC American Group notation).

29. An aqueous fluid comprising:
water;
at least one amidoamine oxide viscoelastic surfactant (VES) in an amount effective to increase the viscosity of the aqueous fluid; and
a composition in an amount effective to reduce the viscosity of the gelled aqueous fluid, where the composition comprises:
from about 0.01 to about 300 ppm, based on the total fluid of at least one transition metal ion source;
at least one chelating agent; and
at least one reducing agent source;
where the composition reduces the viscosity of the gelled aqueous fluid by a mechanism selected from the group consisting of disaggregating a micelle structure of the VES, rearranging a micelle structure of the VES, chemically altering an effective amount of the VES, and combinations thereof.

30. The aqueous fluid of claim 29 where the transition metal ion source is a transition metal salt or transition metal complex.

31. The aqueous fluid of claim 29 where the transition metal in the transition metal salt or transition metal complex is a transition metal selected from the group consisting of Groups VA, VIA, VIIA, VIIIA, IB, IIB, IIIB, and IVB of the Periodic Table (previous IUPAC American Group notation).

32. The aqueous fluid of claim 29 where the chelating agent is selected from the group consisting of carboxylic acids, aminocarboxylic acids, polyols, alkanolamines, and combinations thereof.

33. The aqueous fluid of claim 29 where the reducing agent source is an organic acid salt selected from the group consisting of erythorbates, dehydroascorbates, citrates, ascorbates, sulfites, thiols, and alkali metal, alkaline earth metal and ammonium salts thereof.

34. The aqueous fluid of claim 29 where
the amount of reducing agent source ranges from about 5 to about 50 pptg (about 0.6 to about 6 kg/m$^3$), based on the total fluid; and
the amount of chelating agent ranges from about 0.1 to about 50 pptg (about 0.012 to about 6 kg/m$^3$),
based on the total fluid.

* * * * *